UNITED STATES PATENT OFFICE.

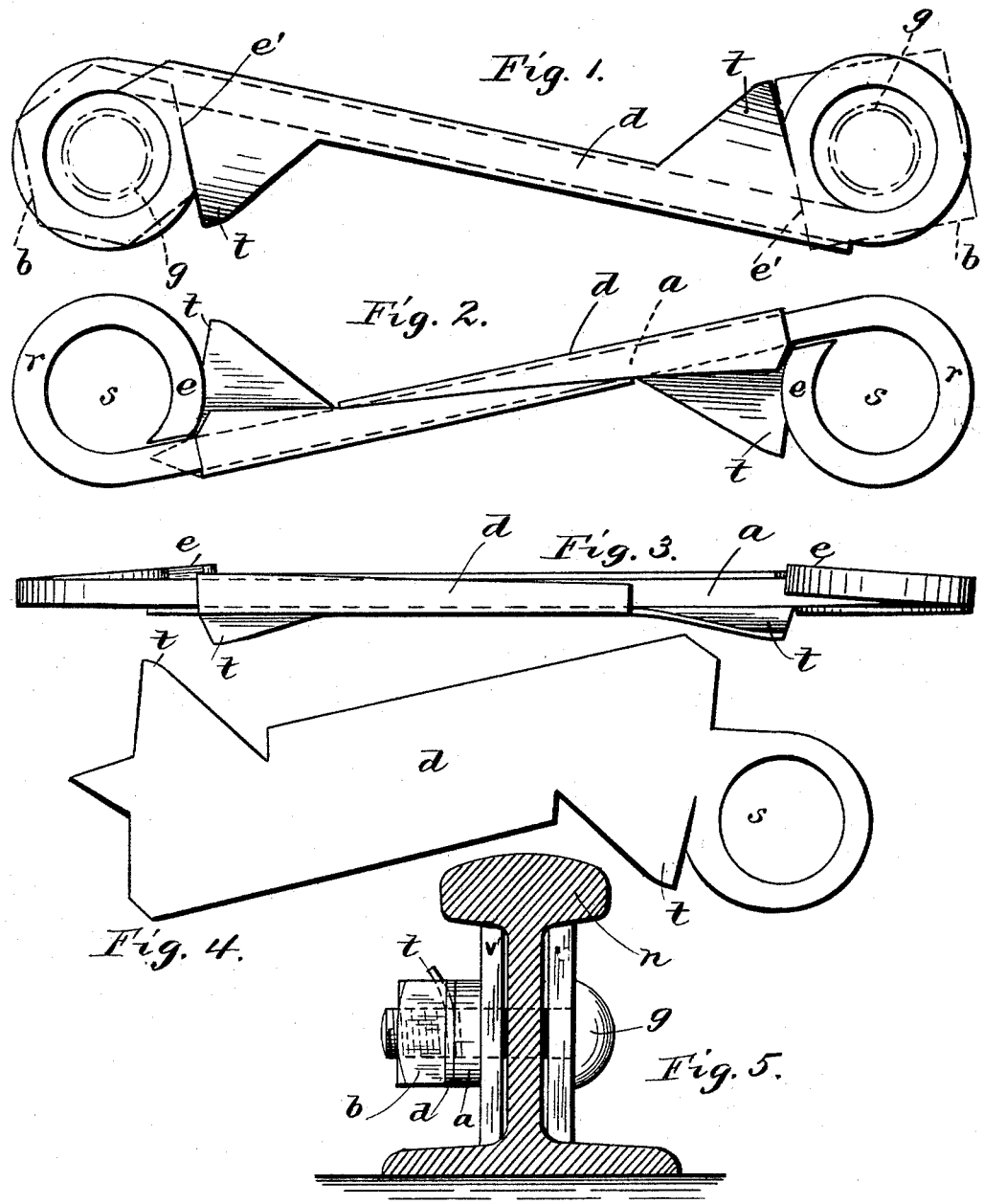

JOHN G. PERRY, OF WAKEFIELD, RHODE ISLAND.

NUT-LOCK AND BOLT-TIGHTENER.

SPECIFICATION forming part of Letters Patent No. 491,718, dated February 14, 1893.

Application filed December 7, 1891. Renewed August 4, 1892. Serial No. 442,123. (No model.)

*To all whom it may concern:*

Be it known that I, JOHN G. PERRY, of Wakefield, in the county of Washington, in the State of Rhode Island, have invented certain new and useful Improvements in Nut-Locks, of which the following is a specification, reference being had to the accompanying drawings, making part of the same.

This invention relates to a class of devices for preventing nuts on screw-bolts from becoming loose and working off,—devices known as "nut locks," and this invention refers more especially to the nuts and bolts used to secure the fish plates and the ends of railway rails together, and is fully described in the following drawings in which:—

Figure 1 is a top view of the nut lock with the nuts. Fig. 2 is a view of the under side of the same. Fig. 3 is an edge view of the nut lock. Fig. 4 is a view of the plate separate, and Fig. 5 is an end view of the nut lock in position on the rail,—the latter being shown in section.

The advantages desired to be attained, by means of a nut lock on a railway, are not confined merely to preventing the nuts from becoming unscrewed from off the bolt, but also include taking up any looseness produced by the wear of the parts caused by their rubbing together, when trains pass over them, or otherwise, and to combine a positive stop to prevent the nuts from turning and a spring sufficiently strong, to hold the parts closely together. This last purpose is accomplished by means of a metallic bar $a$. bent back upon itself at each end to form eyes or circles $r$. $r$. the centers of which are the same distance apart as the centers of the holes made in the rails to receive the bolts, by which the fish plates are held. The ends $e$. of the bar $a$. in the circle are bent down below the plane of the rest of the bar (see Fig. 3) to form a short, stiff, spiral, tension spring at each end. The plate or blank $d$ is cut out of plate metal of a size to cover the surface of the bar $a$. and a hole or eye is made through it, at one or both ends as at S. Fig. 4, agreeing with the inner circle of the metallic bar $a$. with the outer ends of said plates cut off around and conforming to the outer circle $r$. and a transverse slot $t$, is made at or near each end of the plate $d$. and on opposite sides at about where the inner corners and sides of said nuts come when they are screwed down on the bolts with the sides of one nut agreeing with or on a line parallel or nearly so, with the sides of the other, or fellow nut, or instead of surrounding the bolts, with said plates at the ends they may be cut off anywhere between said ends and said slots $t$. and on a line therewith leaving a small projection of the ends of said plates for the face of the nut to rest upon as shown at the left hand end of the drawings of plate $d$. Fig. 4, to prevent it from catching against the end of said plate when being screwed on, or the ends of said plate or corners of the nuts or both may be beveled away to allow them to pass each other. The plate $d$. is attached to the bar $a$. by folding the central side portions thereof, over and around said bar $a$. bringing the corners opposite to the slots or ends $t$., against the raised or bent down tension ends $e$. of the circles of bar $a$., so as to prevent the plate $d$. from sliding endwise on said bar $a$. The corners $t$. of the ends of plate $d$. at or near the ends of plate $d$, shown at Figs. 2 and 4. are sprung, swaged or bent up above the surface of the plate $d$. to present their edges toward the nuts and to lock and hold and prevent them from turning back see Fig. 1. These ends $t.\ t.$ are not cut square in but slant towards the centers of the end circles $s.$ for the purpose of accommodating nuts of different sizes or hexagon nuts that have shorter sides than the square ones as at Fig. 1.

The method of applying this nut lock is this, after the bolts $g.\ g.$ have been put through the fish plate $v.$ rail $w.$ and fish plate $v'$, the nut lock comprising the bar $a.$ and the plate $d.$ is put on the bolts so as to have a bolt through each eye or circle at the ends, with the back of the spring eyes, or circles, and bent down tension ends, of said bar $a$, next to the fish plate. The nuts $b.\ b.$ are then screwed on to the bolts $g.$ until the spring coils $r$, are pressed down flat to the fish plate $v'.$ the corners of the nuts $b$ passing easily over the points $t\ t.$ in that direction and being sprung, swaged or bent up after the corner passes, present an edge toward the side of the nut which locks and holds the nuts from turning back, unless said points are bent down, as is easily done with the thumb or finger or both when necessary to unscrew them or take them off for any purpose, and the spiral circles and bent down tension ends of the bars *a.* take up any looseness arising from the wear of the parts or otherwise, and keep the bolts tight; and the fish plate pressed close to the rails; and the points or ends *t. t.* of the plate *d.* lock and hold and prevent the nuts from turning back and off of the bolts from the jar &c. from the running of the trains over them &c.

Having thus described this improvement I claim

A nut lock and bolt tightener having a metallic bar *a.* with its ends bent around and down to encircle the bolts and to form short, stiff, spiral springs, with the plate *d.* having the points or ends *t t.* swaged, stamped, turned or bent up to lock and hold the nuts,— the bar and plate being held together by having parts of said plate secured tightly around and against or to the bar, substantially as and for the purposes herein set forth.

JOHN G. PERRY.

Witnesses:
M. F. PERRY,
H. B. PERRY.